United States Patent
Edwards et al.

(10) Patent No.: US 6,901,675 B2
(45) Date of Patent: Jun. 7, 2005

(54) SYSTEM AND METHOD FOR SIZING A CENTER BORE OF A LAMINATED ROTOR

(75) Inventors: Jerry D. Edwards, Bristol, VA (US); David T. Monk, Bristol, VA (US); John W. Tolbert, Bristol, TN (US)

(73) Assignee: Bristol Compressors, Inc., Bristol, VA (US)

( * ) Notice: Subject to any disclaimer, the term of this patent is extended or adjusted under 35 U.S.C. 154(b) by 0 days.

(21) Appl. No.: 10/445,672

(22) Filed: May 27, 2003

(65) Prior Publication Data

US 2004/0237322 A1 Dec. 2, 2004

(51) Int. Cl.$^7$ ................................................. G01B 5/12
(52) U.S. Cl. ........................... 33/542; 33/543; 702/157
(58) Field of Search .......................... 33/542, 543, 555.1; 702/157, 166, 189, 199

(56) References Cited

U.S. PATENT DOCUMENTS

| | | | |
|---|---|---|---|
| 3,845,547 A | * 11/1974 | Reynolds .................... 29/596 |
| 3,909,951 A | 10/1975 | Meier |
| 4,167,066 A | * 9/1979 | Cooper et al. ............... 33/504 |
| 4,619,028 A | * 10/1986 | Neuenschwander ......... 29/33 L |
| 4,700,484 A | * 10/1987 | Frank et al. ................. 33/773 |
| 4,788,772 A | 12/1988 | Van Sickle et al. |
| 4,791,728 A | 12/1988 | Van Sickle et al. |
| 5,010,658 A | 4/1991 | Griffith et al. |
| 5,157,845 A | 10/1992 | Possati et al. |
| 5,170,306 A | * 12/1992 | Gomes ........................ 702/162 |
| 5,828,584 A | * 10/1998 | Oda et al. .................... 702/158 |
| 6,088,923 A | 7/2000 | Guerin |
| 6,115,930 A | 9/2000 | Shigyo |
| 6,412,187 B1 | 7/2002 | Sasaki et al. |
| 6,490,805 B1 | 12/2002 | Forschler et al. |

FOREIGN PATENT DOCUMENTS

| | | | |
|---|---|---|---|
| JP | 5 511 3902 | 9/1980 | |
| JP | 4 313 003 | 11/1992 | |
| JP | 10179283 A | * 7/1998 | ........... A47B/77/06 |

* cited by examiner

Primary Examiner—Christopher W. Fulton
Assistant Examiner—Amy R. Cohen
(74) Attorney, Agent, or Firm—McNess Wallace & Nurick LLC

(57) ABSTRACT

A system and method of sizing an inner diameter of the center bore of a laminated rotor is provided. The inner diameter of the center bore is determined by taking a series of measurements in the center bore with an electronic gauge and then analyzing the measurements to determine the acceptability of the rotor. The electronic gauge is inserted into the center bore of the rotor and measurements of the inner diameter of the center bore are taken at a variety of different depths and positions using the electronic gauge. The measurements are then analyzed to determine if the rotor is acceptable for use by evaluating the measurements with respect to a reference diameter and a depth in the center bore.

50 Claims, 7 Drawing Sheets

SYSTEM AND METHOD FOR SIZING A CENTER BORE OF A LAMINATED ROTOR

BACKGROUND OF THE INVENTION

The present invention relates generally to a method of determining the inner diameter of a bore. Specifically, the present invention relates to a method of sizing and analyzing the inner diameter of a center bore of a rotor to determine the acceptability of the rotor for attachment to a crankshaft.

A squirrel cage rotor for use in an induction motor has a rotor core and a rotor cage with rotor bars that extend through the rotor core and end rings that connect the rotor bars together at each end of the rotor core. The rotor core is typically made of a magnetic material such as iron or steel and the rotor cage is typically made of an electrically conductive material such as copper, aluminum or an aluminum alloy. The rotor core has a substantially cylindrical shape with a longitudinally extending center or central bore to receive the shaft of the motor and a plurality of longitudinally extending rotor slots or apertures, which rotor slots may be slightly skewed, to receive corresponding rotor bars of the rotor cage. A laminated rotor core is commonly manufactured or formed by stacking or assembling a plurality of discs or laminations of the magnetic material on top of each other until the desired substantially cylindrical shape is obtained. During the stacking or assembling process, the laminations are also aligned or oriented into their proper position. Alternatively, the rotor core can be manufactured from a single piece of the magnetic material, but this technique is less common.

Each lamination in the rotor core is formed or extruded to a pre-selected thickness, shape and configuration. The pre-selected configuration of the laminations includes an aperture for the central bore, a plurality of apertures for the rotor slots positioned equidistantly about the central bore and a predetermined bridge thickness, which bridge thickness is defined as the radial distance between the outer circumference of the lamination and the aperture for the rotor slot. The pre-selected configuration of the lamination can also include other features as needed. As the laminations are stacked to form the rotor core, they are aligned and/or oriented into an appropriate position to form substantially continuous apertures in the rotor core and, if necessary, other desired features of the rotor core.

Next, the rotor cage is manufactured or formed by inserting, casting or injection molding a rotor bar into each of the plurality of rotor slots in the rotor core, which rotor bars extend to at least the ends of the rotor slots, and connecting the adjacent ends of the rotor bars to each other with an end ring. When the rotor is ready for attachment to the crankshaft or shaft of the compressor, which crankshaft generally has an outer diameter greater than the inner diameter of the center bore of the rotor, the rotor is heated to a suitable temperature, typically about 450° F., in a heat shrinking or shrink-fitting operation. This heating of the rotor expands the center bore of the rotor a sufficient amount to receive the crankshaft. After the crankshaft is inserted into the center bore, the rotor is cooled to contract around the crankshaft forming a tight interference fit between the rotor and the crankshaft.

One problem with using a laminated rotor is that the center bore of the rotor may not have a uniform inner diameter as a result of the forming or extruding of each lamination individually, which individual extrusion of laminations can introduce variances in the inner diameters of the center bores of each lamination. The variances in the inner diameter can result in a poor interference fit (or none at all) between the rotor and the crankshaft because there may be too many laminations which do not form an interference fit with the crankshaft due to the variances in the center bore. The poor interference fit between the rotor and the crankshaft as a result of the variances in the inner diameter of the center bore could result in the rotor separating from the crankshaft during operation of the motor such that the rotor would rotate with respect to the crankshaft. One way to avoid this problem is to machine a uniform inner diameter in the center bore of the rotor to ensure an appropriate interference fit with the crankshaft of the compressor. This is an additional step in the rotor fabrication process and results in additional fabrication time and expense.

Therefore, what is needed is a simple, efficient and cost-effective technique for determining if a center bore of an "as-punched" laminated rotor is acceptable for attachment to a crankshaft of a compressor without having to machine the center bore of the laminated rotor.

SUMMARY OF THE INVENTION

One embodiment of the present invention is directed to a method of sizing a center bore of a laminated rotor for acceptability of the rotor in a subsequent operation. The method includes the steps of measuring an inner-diameter of a center bore of a laminated rotor a predetermined number of times to obtain a plurality of inner diameter measurements and evaluating the plurality of inner diameter measurements to determine a reference diameter for the center bore of the laminated rotor. The method also includes the step of comparing the reference diameter to a predetermined reference diameter range. The reference diameter being included in the predetermined reference diameter range indicates the acceptability of the center bore of the laminated rotor.

Another embodiment of the present invention is directed to a system for sizing a center bore of a laminated rotor for acceptability in a subsequent operation. The system includes a gauge for measuring a predetermined number of inner diameter measurements of a center bore of a laminated rotor and means for processing the predetermined number of inner diameter measurements measured by the gauge to determine acceptability of the center bore of the laminated rotor. The means for processing includes means for storing the predetermined number of inner diameter measurements, means for determining a reference diameter for the center bore of the laminated rotor using the predetermined number of inner diameter measurements, and means for comparing the reference diameter to a predetermined reference diameter range. The reference diameter being included in the predetermined reference diameter range indicates acceptability of the center bore of the laminated rotor.

Still another embodiment of the present invention is directed to a computer program product embodied on a computer readable medium and executable by a microprocessor for sizing a center bore of a laminated rotor for acceptability in a subsequent operation. The computer program product comprises computer instructions for executing the steps of receiving a plurality of inner diameter measurements for a center bore of a laminated rotor and evaluating the plurality of inner diameter measurements to determine a reference diameter for the center bore of the laminated rotor. The computer program product also comprises computer instructions for comparing the reference diameter to a predetermined reference diameter range. The reference diameter being included in the predetermined reference diameter range indicates acceptability of the center bore of the laminated rotor.

One advantage of the present invention is that the rotor fabrication process will be quicker and less expensive because machining of the center bore is not necessary for an adequate interference fit.

Another advantage of the present invention is that it provides for adequate surface areas of the rotor and crankshaft to be in contact to form a tight interference fit between the rotor an the crankshaft.

Still another advantage of the present invention is that it can satisfy auditing requirements for the center bore of the rotor.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
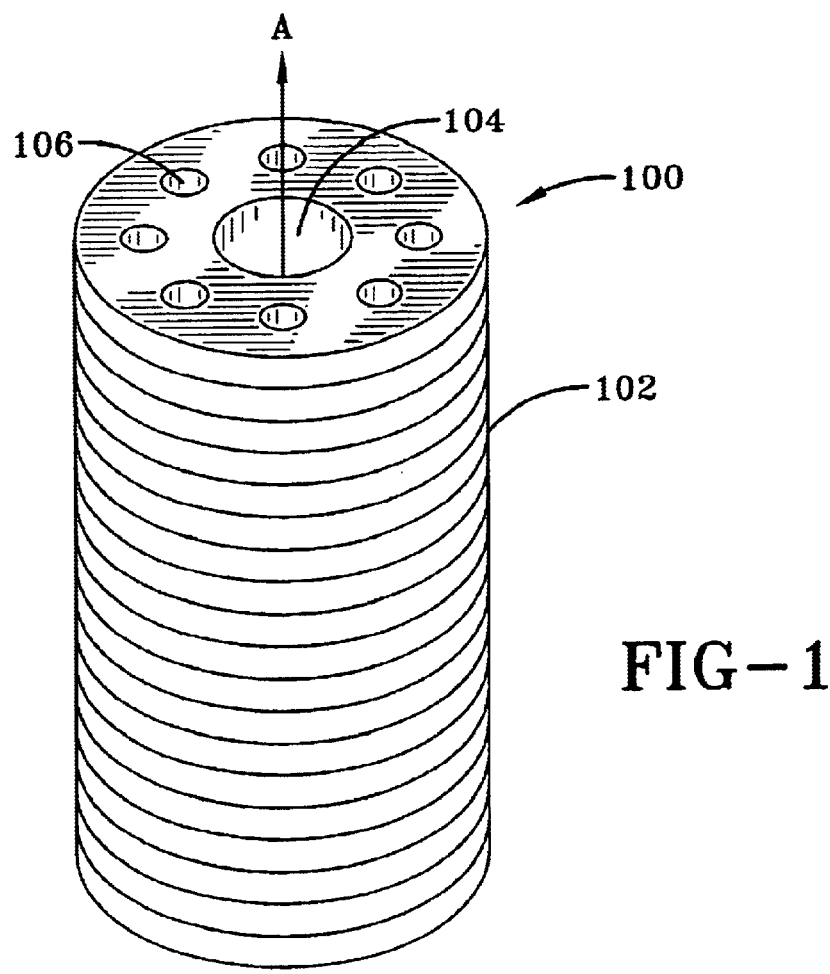
FIG. 1 illustrates a perspective view of a laminated rotor core for use with the present invention.

FIG. 1 illustrates a laminated rotor core 100 for use with the present invention. The laminated rotor core 100 is preferably used in a squirrel cage rotor of an induction motor for a compressor. The laminated rotor core 100 is formed or assembled by stacking a plurality of laminations 102. The number of laminations required to assemble the laminated rotor core 100 is dependent upon the thickness of the laminations 102 and the desired height of the laminated rotor core 100. In one embodiment of the present invention, the thickness of the laminations can range from about 0.015 inches to about 0.025 inches and is preferably 0.022 inches thick for a standard application and 0.018 inches thick for a "low loss" application.

Figure 2:
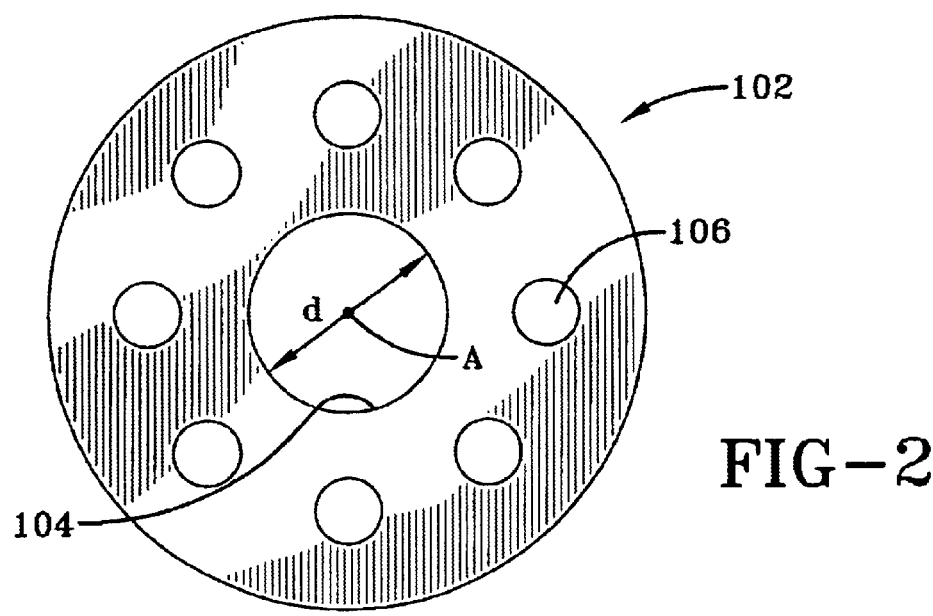
FIG. 2 illustrates a top view of a lamination from the laminated rotor core of FIG. 1.

FIG. 2 illustrates a top view of a lamination 102. Each lamination 102 that is assembled into the laminated rotor core 100 preferably has a center or central aperture or bore 104 having an inner diameter "d." The central bore 104 of the laminated rotor core 100 is configured to receive a shaft of the motor as will be described in greater detail below. In addition, each lamination 102 preferably has a plurality of rotor slots or apertures 106 that can have any desired shape including oval, circular, rectangular, irregular or any other suitable shape. The plurality of rotor slots 106 are preferably positioned equidistant and/or equiangular to one another circumferentially about the axis A. The shape, number and size of the rotor slots 106 is dependent on the particular configuration of the motor and rotor cage used. Furthermore, each rotor slot 106 is positioned a distance from the outer circumference of the lamination 102, which distance corresponds directly to the bridge thickness of the lamination 102. Finally, it is to be understood that the lamination 102 can include additional features which are not shown for simplicity.

The laminations 102 are formed from a magnetic material such as iron or steel by an extrusion or pressing operation of one or more steps preferably using a precision punch press. The pressing or extruding operation preferably produces a lamination 102 having an inner diameter and an outer diameter within a narrow tolerance range. It is to be understood that any pressing or extruding operation that can produce a lamination 102 having an inner diameter and an outer diameter within the narrow tolerance range can be used. After the laminations 102 are extruded, they are stacked or assembled to obtain the laminated rotor core 100. An interlocking mechanism (not shown) is used to hold the laminations together until the core can be transported and inserted into the die cast machine, or other suitable device for casting or injection molding the rotor bars. The interlocking mechanism is used to hold the laminations together instead of providing one or more weld joints along the length of the outer diameter of the laminated rotor core 100, as was previously done.

During the assembly operation, the laminations 102 are preferably aligned and/or oriented to obtain a central bore 104 which extends substantially longitudinally and coaxially through the laminated rotor core 100 and to obtain rotor slots 106 which extend substantially longitudinally through the laminated rotor core 100 and which may or may not be skewed. After the laminated rotor core 100 is assembled and aligned, the rotor bars and end rings are then positioned in and about the laminated rotor core 100, preferably by a casting or injection molding operation, but, other suitable processes can be used. Finally, while not described herein, the remaining process steps for the manufacture of the rotor would be substantially completed as is well known in the art.

Figure 3:
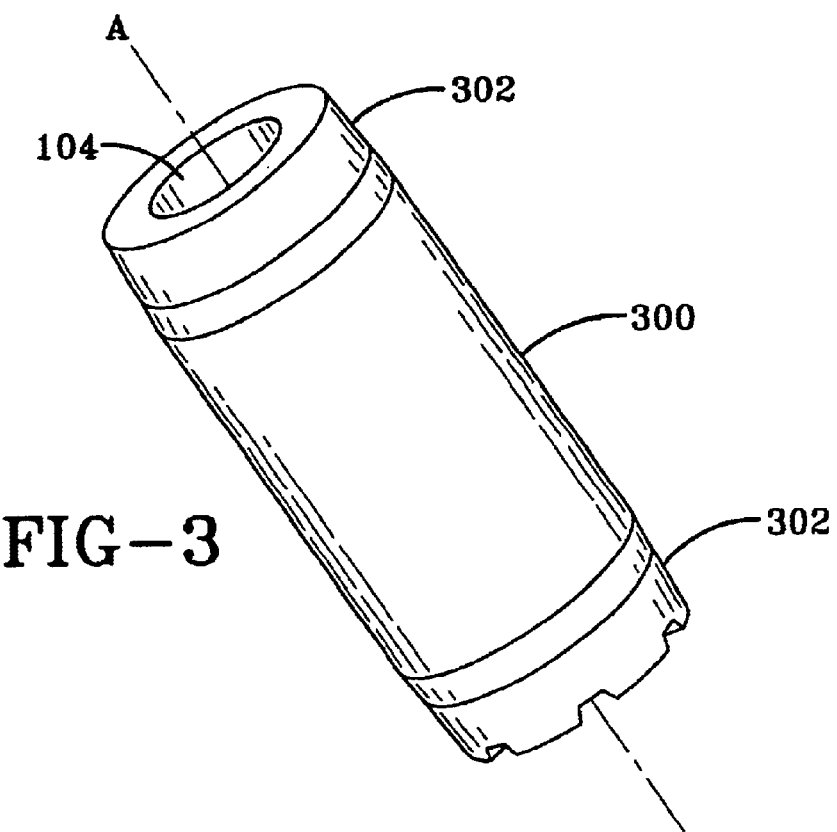
FIG. 3 illustrates a perspective view of a rotor from an embodiment of the present invention.
Figure 4:
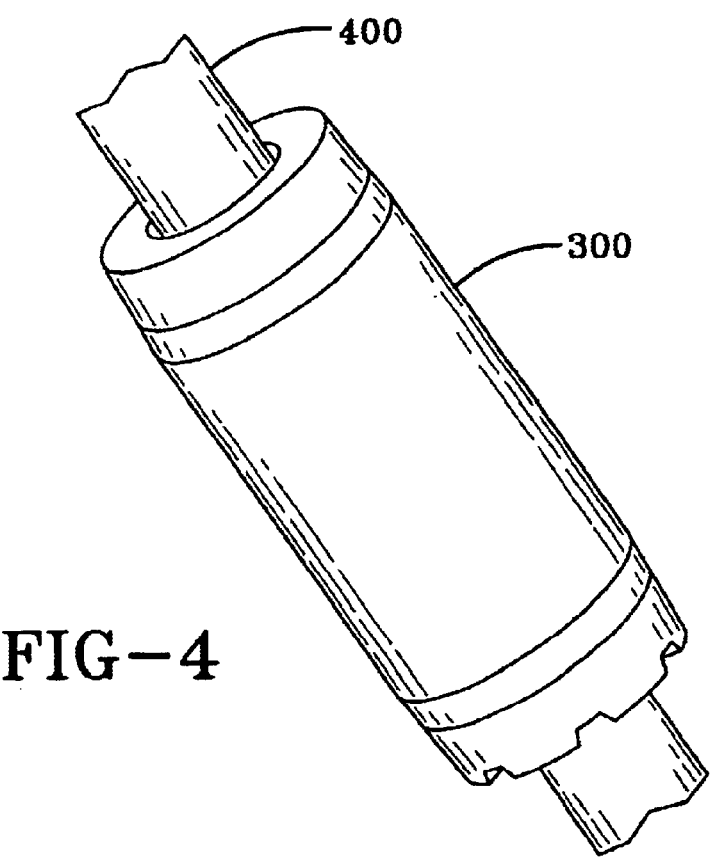
FIG. 4 illustrates a perspective view of a rotor attached to a shaft from an embodiment of the present invention.

FIG. 3 illustrates a rotor 300 after the casting operation has been completed and the rotor 300 has sufficiently cooled. End rings 302 connect the rotor bars that have been cast into the rotor core 100. At this point, the rotor 300 is ready for attachment to a shaft or crankshaft, which shaft preferably has an outer diameter greater than the inner diameter of the center bore 104, by a heat shrinking or shrink-fitting operation to expand the center bore 104 of the rotor 300 a sufficient amount to receive the shaft. Once the rotor 300 is properly heated during the heat shrinking operation, i.e., the center bore 104 of the rotor 300 has expanded sufficiently to receive the shaft, the shaft is inserted into the center bore 104 of the rotor 300, or alternatively, the rotor 300 is positioned on the shaft via the center bore 104. After the rotor 300 is positioned on the shaft, the rotor 300 is permitted to cool. Upon cooling of the rotor 300, the rotor core 100 contracts around the shaft to form a tight interference fit or connection between the rotor 300 and the shaft. FIG. 4 illustrates the rotor 300 attached to a shaft 400. However, before the rotor 300 can be connected to the shaft, the inner diameter of the rotor 300 has to be sized to determine if a proper interference fit between the rotor 300 and the shaft 400 will be formed after the heat shrinking or shrink-fitting operation.

Figure 5:
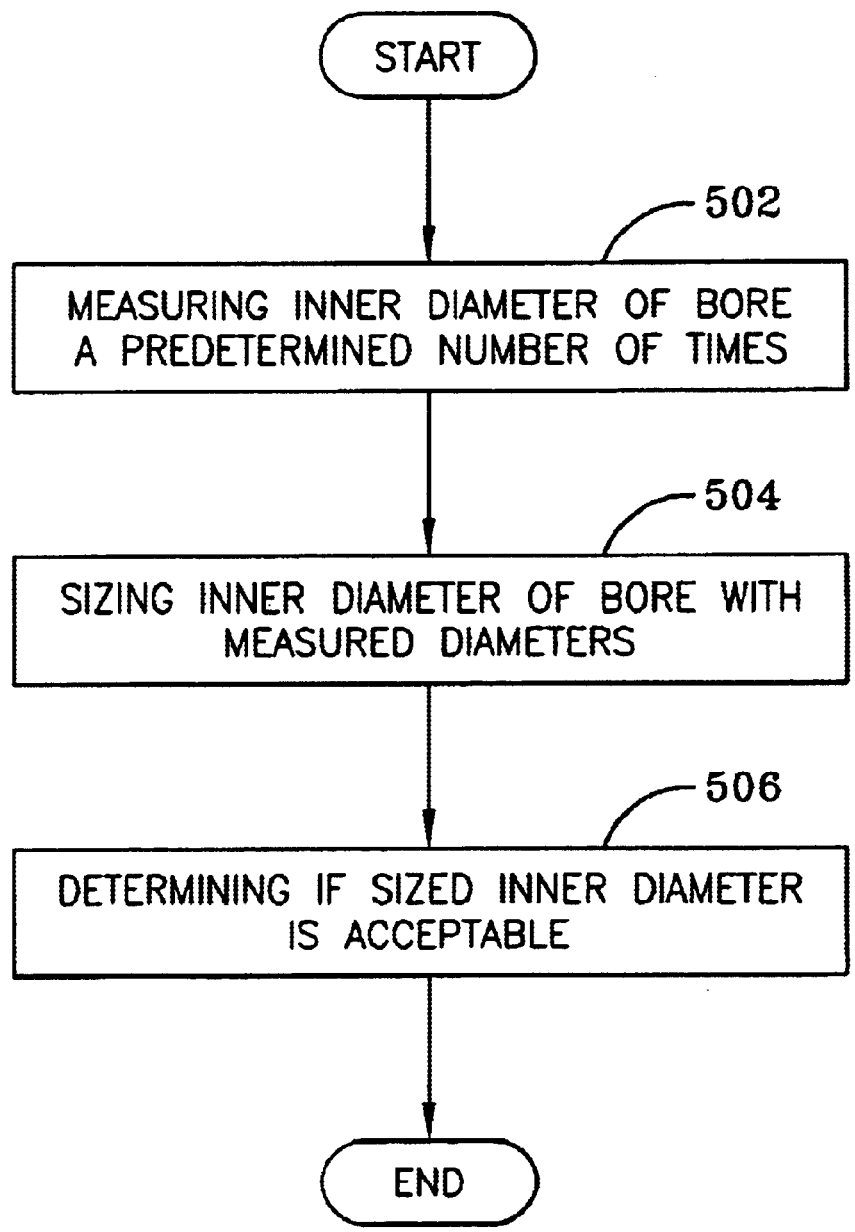
FIG. 5 illustrates a flowchart of the process for determining if the center bore of a rotor is acceptable for use.

FIG. 5 illustrates the general process for determining if the center bore 104 of a rotor 300 is acceptable for the subsequent attachment of the rotor 300 to a shaft 400 by a heat shrinking operation. The process begins at step 502 with the measuring of the inner diameter of the center bore 104 of the rotor 300 a predetermined number of times. The inner diameter of the center bore 104 is measured at several different depths and angular positions within the center bore 104 as will be discussed in greater detail below. Next, in step 504, the inner diameter of the center bore 104 is sized using the inner diameter measurements of step 502 to determine several characteristics of the center bore 104. Finally, in step 506, a determination is made using the center bore characteristics of step 504 of whether the sized inner diameter of the center bore 104 is acceptable for the subsequent attachment of the rotor 300 to a shaft 400 by a heat shrinking operation.

In another embodiment of the present invention, steps 504 and 506 can be combined or merged into a single step. The combined step(s) would involve the determining of a sizing characteristic of the inner diameter of the center bore 104 and then determining the acceptability of the center bore 104 based on the sizing characteristics almost immediately after the sizing characteristic has been determined.

Figure 6:
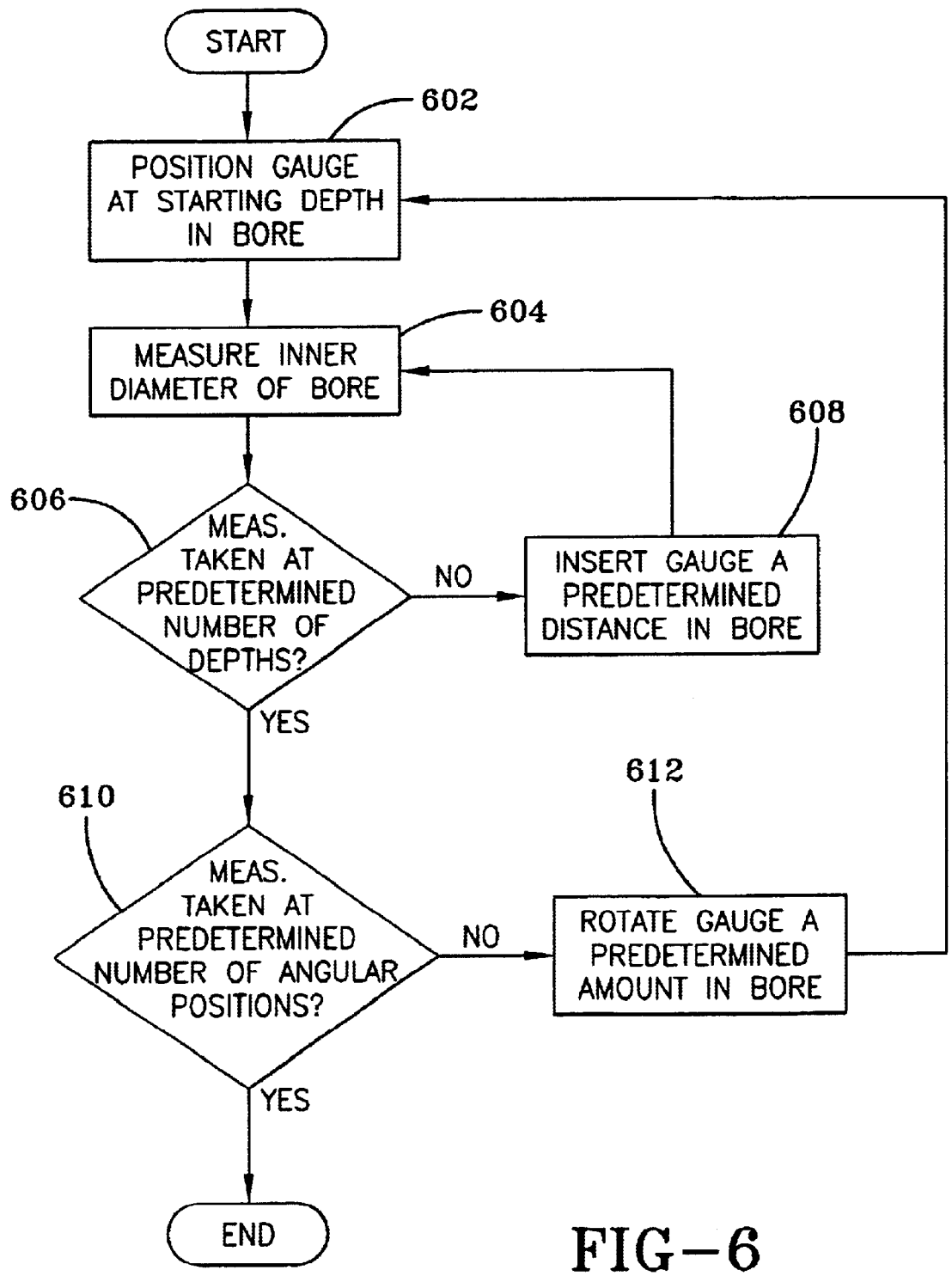
FIG. 6 illustrates a flowchart detailing the procedure of process step 502 of FIG. 5.

FIG. 6 illustrates a process of measuring the inner diameter of the center bore 104 from step 502 of FIG. 5. The process begins at step 602 by positioning a gauge at a starting depth in the center bore 104. The gauge is preferably any suitable type of electronic gauge that is capable of accurately measuring the inner diameter of the center bore 104. The electronic gauge can preferably provide a measurement resolution of about 0.00001 inches and can include contact points that are preferably configured or sized to cover two laminations 102 of the rotor 300 during the measurement process. The required resolution and sizing of the contact points can be adjusted as necessary in order to accommodate different sizes and types of rotors 300 and center bores 104. In one embodiment of the present invention, the electronic gauge can incorporate two opposing roller balls to measure the inner diameter of the center bore 104. In this embodiment, the roller balls of the electronic gauge would have about a 2.5 mm spherical radii.

In step 602, the gauge is inserted into the center bore 104 to a predetermined starting depth in the center bore 104. The predetermined starting depth is measured from the end of the laminated rotor core 100 and can range from about 0.125 to about 1.0 inch depending on the size of the center bore 104. Preferably, the predetermined starting depth is about 0.5 inches for a center bore 104 having a length between about 3.5 inches to about 4.5 inches. The distance between the end of the laminated rotor core 100 and the predetermined starting depth can be referred to as a non-effective distance. The non-effective distance is a portion of the laminated rotor core 100 that is not necessary for a tight interference fit between the rotor 300 and the shaft 400. However, in another embodiment of the present invention, the predetermined starting depth can be zero or 0 inches, which corresponds to having no non-effective distance and results in a measurement being taken at the edge of the center bore 104. After the gauge has been inserted into the center bore 104 to the starting depth in step 602, a measurement of the inner diameter of the center bore 104 can be taken in step 604.

In step 606, a determination is made as to whether inner diameter measurements have been taken at a predetermined number of depths within the center bore 104. Measurements are taken at a predetermined number of depths in the center bore 104 in order to be able to more accurately size the inner diameter of the center bore 104 over the entire length of the center bore 104. The predetermined number of depths can range from 3 measurement depths to 20 or more measurement depths depending on the length of the center bore 104 and is preferably 10 measurement depths for a center bore 104 having a length between about 3.5 inches to about 4.5 inches.

If measurements have not been taken at a predetermined number of depths in step 606, then the gauge is further inserted into the center bore 104 a predetermined distance in step 608 and the process returns to step 604 to take an inner diameter measurement at the new depth in the center bore 104. The predetermined distance between measurement depths is determined by the length of the center bore 104, the number of measurement depths, the predetermined starting depth and a predetermined ending depth. The predetermined ending depth is substantially similar to the predetermined starting depth except for the predetermined ending depth being measured from the end of the center bore 104 opposite the predetermined starting depth end. The use of the predetermined distance between measurement depths provides for an even spacing of the inner diameter measurements in the center bore 104 and a more accurate sizing of the center bore 104.

Figure 7:
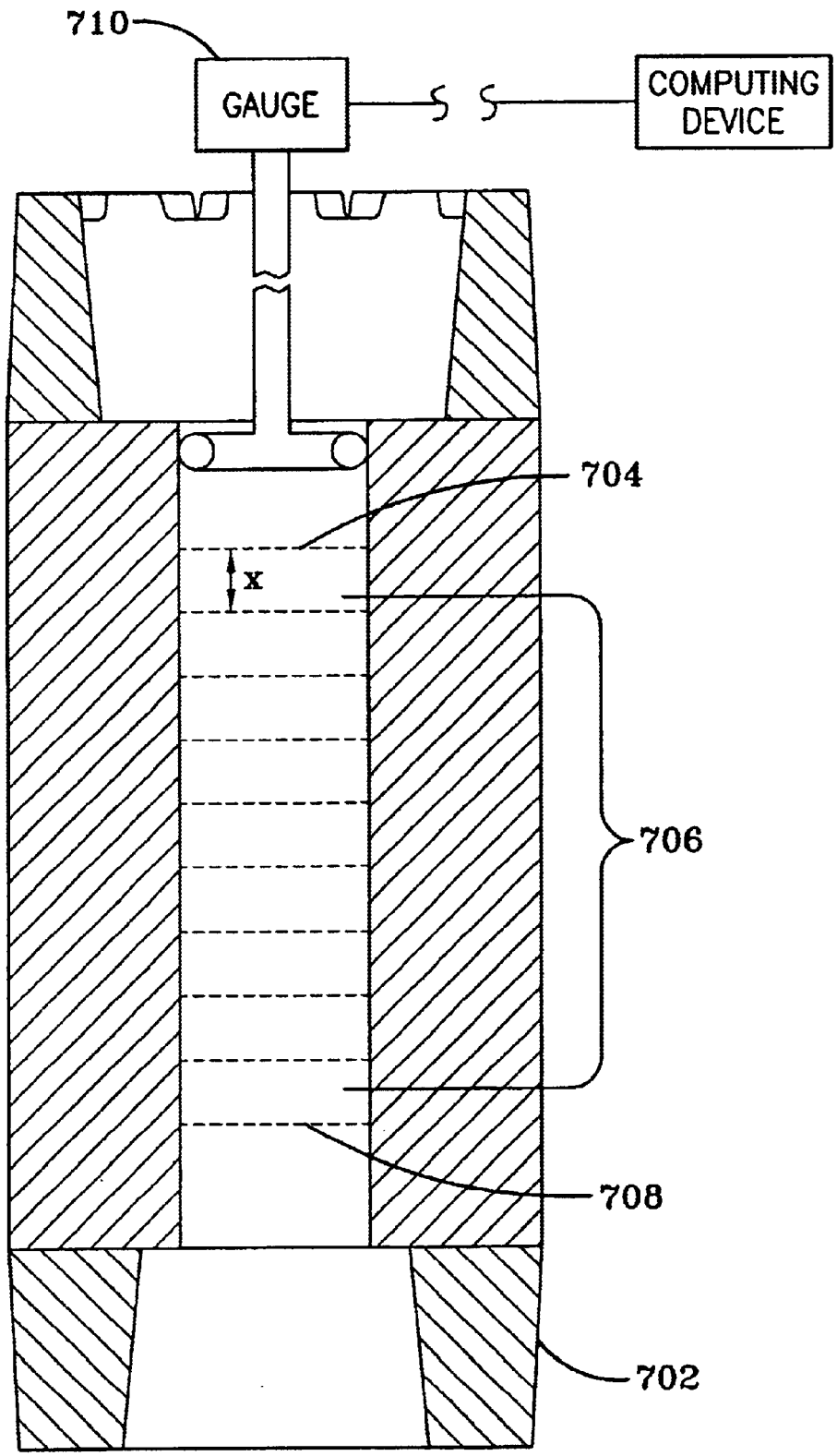
FIG. 7 is a cross-section of a rotor from one embodiment of the present invention illustrating the measurement locations in the center bore of the rotor.

FIG. 7 is a cross-section of a rotor that illustrates the locations of the starting depth, the ending depth and the intermediate measurement depths in the center bore of a rotor for one embodiment of the present invention. In this embodiment, an end 702 of the rotor would be placed on a flat surface and the gauge 710 would be inserted into the center bore to a starting depth 704. The gauge 710 would then be repeatedly inserted further into the center bore a predetermined distance "x" to obtain the intermediate measurement depths 706 until the ending depth 708 is reached. As can be seen in FIG. 7, the location of the starting depth 704 and ending depth 708 are substantially similar except for their position at different ends of the rotor core.

Referring back to FIG. 6, if measurements have been taken at the predetermined number of depths in step 606, then a determination is made in step 610 if measurements have been taken at a predetermined number of angular positions in the center bore 104. Measurements are taken at a predetermined number of angular positions in order to be able to more accurately size the inner diameter of the center bore 104 using measurements related to the entire circumference of the center bore 104. The predetermined number of angular positions can range from 2 angular positions to 12 or more angular positions and is preferably 6 angular positions.

If measurements have not been taken at the predetermined number of angular positions in step 610, then the gauge is rotated a predetermined amount in the center bore 104 in step 612 and the process returns to step 602 to position the gauge at the starting depth of the center bore 104. In another embodiment of the present invention, the gauge could be positioned at the starting depth and then rotated the predetermined amount, i.e., steps 612 and 602 can be reversed. The predetermined amount of rotation between measurements is determined by dividing 180 degrees by the number of desired angular measurement positions. For example, in the preferred embodiment there are 6 angular positions which result in a predetermined amount of rotation of 30 degrees between angular positions of the gauge in the center bore 104. Referring back to step 610, if measurements have been taken at a predetermined number of angular positions, then the process ends and sizing of the inner diameter of the center bore can begin in step 504 of FIG. 5.

In another embodiment of the present invention, the gauge can be inserted to the ending depth in the center bore 104 in step 602 and withdrawn from the center bore 104 a predetermined distance in step 608. In this embodiment, measurements are taken from bottom to top instead of top to bottom as described in the process of FIG. 6. In still another embodiment of the present invention, steps 606 and 608 can be interchanged with steps 610 and 612. In this embodiment, measurements are taken at all of the angular positions for a particular measurement depth before progressing to the next measurement depth, instead of taking measurements at all of the measurement depths for a particular angular position as described in the process of FIG. 6.

Figure 8:
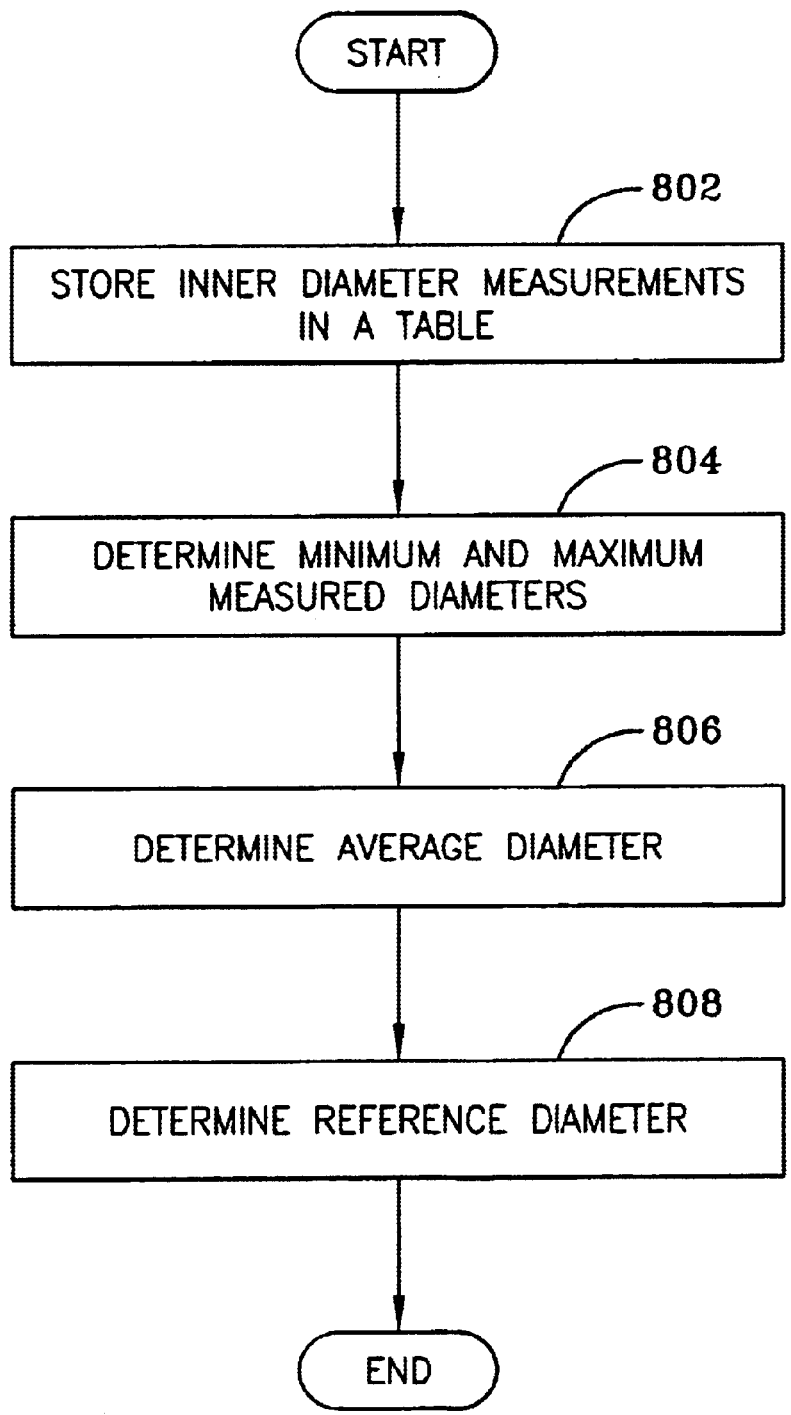
FIG. 8 illustrates a flowchart detailing the procedure of process step 504 of FIG. 5.

FIG. 8 illustrates a process of sizing the inner diameter of the center bore 104 from step 504 of FIG. 5. The process begins at step 802 by storing all of the inner diameter measurements from step 502 of FIG. 5 (and FIG. 6) in a table or spreadsheet. The use of a table or spreadsheet is preferred in step 802, but any suitable storage arrangement can be used such as databases, charts, etc., provided that the measurements stored therein can be subsequently processed. In addition, when storing the inner diameter measurements in the spreadsheet or table, the measurements can be processed to obtain more manageable or useful data, e.g. rounding the measurement from the gauge to a desired tolerance or degree of precision. After the inner diameter measurements are stored in step 802, the minimum inner diameter and the maximum inner diameter are determined in step 804. As would be expected, the minimum inner diameter is the smallest inner diameter measurement from the center bore 104 and the maximum inner diameter measurement is the largest inner diameter measurement from the center bore 104.

In step 806, the average diameter of the center bore 104 is determined from the average of the minimum inner diameter and the maximum inner diameter. In another embodiment of the present invention, the average diameter can be determined as the average of all of the inner diameter measurements from the center bore 104. Finally, in step 808 the reference diameter for the center bore 104 is determined. The reference diameter for the center bore is determined to be the diameter which is greater than a predetermined percentage of inner diameter measurements of the center bore 104. The predetermined percentage used for determining the reference diameter can range between 35% and 75% of the inner diameter measurements and is preferably 50% of the inner diameter measurements. In other words, in a preferred embodiment of the present invention, the reference diameter is greater than 50% of the inner diameter measurements for the center bore 104. One way to determine the reference diameter is to arrange the inner diameter measurements in order from smallest to largest and then to sequentially count the inner diameter measurements, starting with the smallest inner diameter measurement, until the number of the inner diameter measurements corresponding to the desired inner diameter measurement percentage is obtained. This inner diameter measurement would then correspond to the reference diameter. It is to be understood that other suitable techniques for determining the reference diameter can also be used.

To assist in understanding the sizing determinations described with regard to FIG. 8, the following example is provided. In this example, measurements have been taken at 6 angular positions and at 10 different depths to provide a total of 60 measurements. A table of the measurements (in inches), which corresponds to step 802, is provided in Table 1 below.

TABLE 1

|  | Angular Pos. 1 | Angular Pos. 2 | Angular Pos. 3 | Angular Pos. 4 | Angular Pos. 5 | Angular Pos. 6 |
| --- | --- | --- | --- | --- | --- | --- |
| Depth 1 | 1.0001 | 0.9988 | 0.9991 | 0.9991 | 1.0008 | 1.0001 |
| Depth 2 | 1.0008 | 0.9996 | 0.9999 | 0.9992 | 1.0006 | 1.0003 |
| Depth 3 | 1.0005 | 0.9996 | 0.9997 | 0.9991 | 1.0005 | 0.9996 |
| Depth 4 | 1.0006 | 0.9989 | 0.9990 | 0.9993 | 1.0010 | 1.0004 |
| Depth 5 | 1.0010 | 0.9996 | 0.9993 | 0.9994 | 1.0012 | 1.0005 |
| Depth 6 | 1.0010 | 0.9996 | 0.9998 | 0.9998 | 1.0011 | 1.0004 |
| Depth 7 | 1.0013 | 0.9996 | 0.9997 | 0.9993 | 1.0006 | 1.0007 |
| Depth 8 | 1.0008 | 0.9998 | 0.9999 | 0.9994 | 1.0010 | 1.0006 |
| Depth 9 | 1.0004 | 0.9994 | 0.9998 | 0.9998 | 1.0006 | 1.0009 |
| Depth 10 | 1.0004 | 0.9993 | 1.0000 | 1.0002 | 1.0006 | 1.0007 |

The minimum inner diameter and the maximum inner diameter from Table 1, which corresponds to step 804, is 0.9988 inches (Depth 1, Angular Position 2) and 1.0013 inches (Depth 7, Angular Position 1), respectively. The average diameter is determined by adding the minimum inner diameter and the maximum inner diameter and dividing by 2, which corresponds to step 806, and based on the measurements in Table 1 is 1.0001 inches. Finally, the reference diameter can be obtained, which corresponds to step 808, using a 50% predetermined percentage. The use of 50% for the predetermined percentage of the reference diameter results in the 30$^{th}$ largest inner diameter measurement corresponding to the reference diameter and based on the measurements in Table 1, the reference diameter is 1.0000 inch. A listing of the individual inner diameter measurements (in inches), the number of occurrences of each individual inner diameter measurement and the count to the 30$^{th}$ inner diameter measurement is provided in Table 2.

TABLE 2

| Inner Diameter | # Occur | Ref. Diam. Count |
| --- | --- | --- |
| 0.9988 | 1 | 1 |
| 0.9989 | 1 | 2 |
| 0.9990 | 1 | 3 |
| 0.9991 | 3 | 6 |
| 0.9992 | 1 | 7 |
| 0.9993 | 4 | 11 |
| 0.9994 | 3 | 14 |
| 0.9995 | 0 | 14 |
| 0.9996 | 6 | 20 |
| 0.9997 | 2 | 22 |
| 0.9998 | 5 | 27 |
| 0.9999 | 2 | 29 |
| 1.0000 | 1 | 30 |
| 1.0001 | 2 | 32 |
| 1.0002 | 1 | 33 |
| 1.0003 | 1 | 34 |
| 1.0004 | 4 | 38 |
| 1.0005 | 3 | 41 |
| 1.0006 | 6 | 47 |
| 1.0007 | 2 | 49 |
| 1.0008 | 3 | 52 |
| 1.0009 | 1 | 53 |
| 1.0010 | 4 | 57 |
| 1.0011 | 1 | 58 |
| 1.0012 | 1 | 59 |
| 1.0013 | 1 | 60 |

Figure 9:
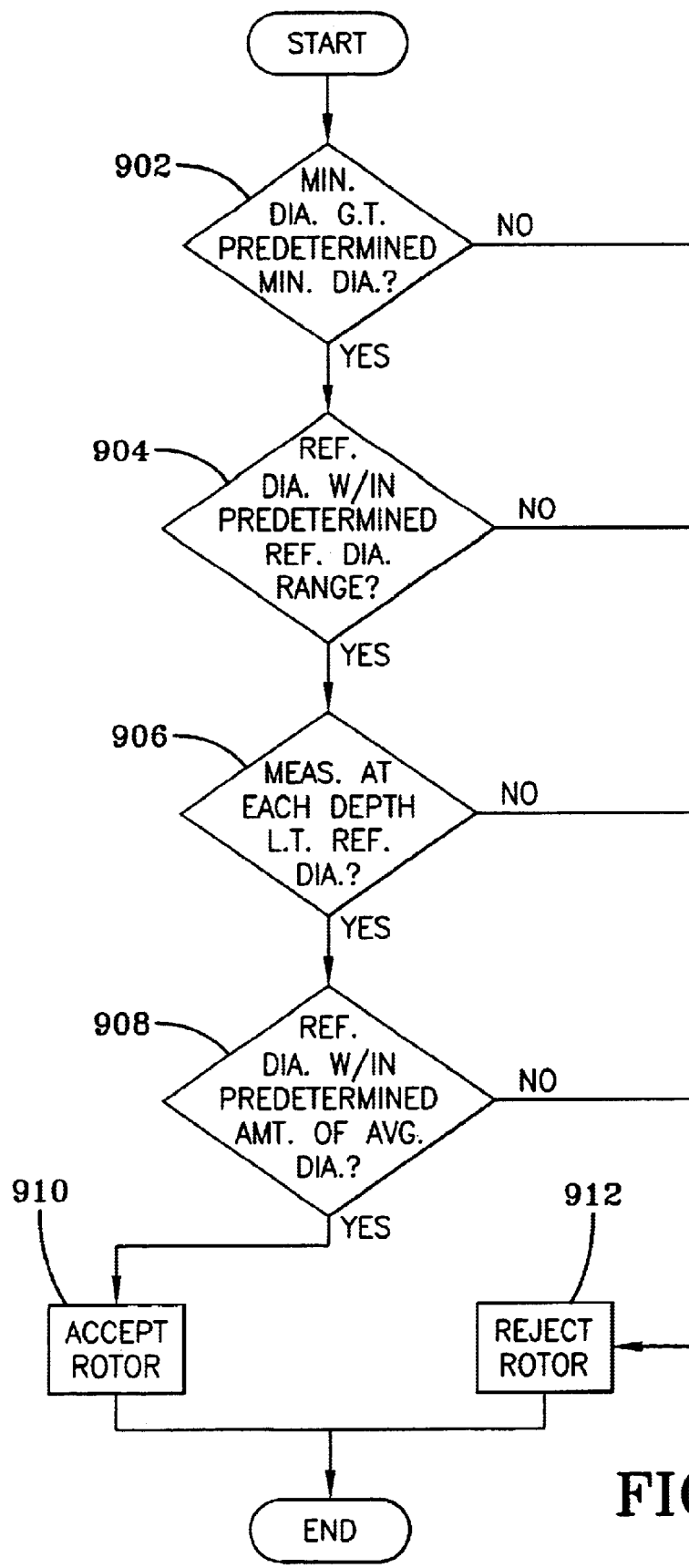
FIG. 9 illustrates a flowchart detailing the procedure of process step 506 of FIG. 5.

FIG. 9 illustrates a process of determining if the sized inner diameter of the center bore 104 is acceptable from step 506 of FIG. 5. The process begins at step 902 by determining if the minimum inner diameter measurement (determined in step 804) is greater than a predetermined minimum diameter. The predetermined minimum diameter determination of step 902 is used to ensure that the rotor 300 can be placed on the shaft 400 and operated safely, i.e., the center bore 104 can be expanded sufficiently to receive the shaft 400 and that the subsequent contraction of the rotor 300 about the shaft 400 does not result in damage to the rotor 300 or the shaft 400. The predetermined minimum diameter for the center bore 104 is determined based on the outer diameter of the shaft 400 and can range from 0.0005 inches to 0.0035 inches less than the outer diameter of the shaft 400 depending on factors ranging from bore uniformity to rotor drop temperature. If the minimum inner diameter measurement is greater than the predetermined minimum diameter in step 902, the process proceeds to step 904, otherwise the rotor is rejected in step 912 and the process ends.

In step 904, a determination is made as to whether the reference diameter (determined in step 808) is within a predetermined reference diameter range. The predetermined reference diameter range determination of step 904 is used to ensure that a proper interference fit between the rotor 300 and shaft 400 can be obtained. The predetermined reference diameter range is determined based on the outer diameter of the shaft 400 and can range from about 0.0003 to about 0.002 inches less than the outer diameter of the shaft 400 and is preferably 0.0005 inches less than the outer diameter of the shaft 400. If the reference diameter falls within the predetermined reference diameter range in step 904, the process proceeds to step 906, otherwise the rotor is rejected in step 912 and the process ends. In another embodiment of the present invention, the reference diameter can be evaluated to see if it is equal to a predetermined reference diameter in step 904.

In step 906, a determination is made as to whether an inner diameter measurement less than the reference diameter is located at each depth in the center bore 104. This reference diameter comparison in step 906 is used to determine if the rotor 300 is fully supported throughout the center bore 104. In another embodiment of the present invention, step 906 can require that there be more than one inner diameter measurement less than the reference diameter at each depth in the center bore 104. If there is an inner diameter measurement that is less than the reference diameter at each depth in the center bore 104 in step 906, the process proceeds to step 908, otherwise the rotor is rejected in step 912 and the process ends.

Finally, a determination is made as to whether the reference diameter (determined in step 808) is within a predetermined range of the average diameter (determined in step 806) in step 908. The average diameter range determination in step 908 is used to determine if the use of the reference diameter for the previous determinations (steps 904 and 906) provides adequate results. If the reference diameter is not within the predetermined range of the average diameter, the center bore 104 may have an uneven distribution of inner diameter measurements which can result in problems in attaching and holding the rotor 300 to the shaft 400. The predetermined average diameter range can be ±0.0003 inches of the average diameter. If the reference diameter is within the predetermined average diameter range in step 908, the rotor can be accepted in step 910, otherwise the rotor is rejected in step 912 and the process ends.

In addition, the average diameter range determination in step 908 can be used to establish a correlation or relationship between the reference diameter and the average diameter. The establishment of a correlation between the reference diameter and the average diameter as being within a predetermined range can permit a greatly simplified rotor evaluation process to be used for the evaluation of rotors 300 on a production line. As an example, the center bore 104 of a rotor 300 can be quickly scanned with a gauge that can provide minimum and maximum values using a process similar to that described above. If the average diameter determined from the measured minimum and maximum values is within the predetermined reference diameter range, the rotor 300 can be assumed to be satisfactory so as long as the correlation between the reference diameter and the average diameter is maintained through the use of auditing and quality control procedures.

In another embodiment of the present invention, steps 902–908 can be completed in any order. The particular order of steps 902–908 is not critical for the determination of acceptability of the center bore 104. Furthermore and as discussed above, the determination steps 902–908 can be completed in conjunction with the sizing steps 802–808. For example, after the minimum inner diameter is calculated in step 804, the minimum inner diameter can be compared to the predetermined minimum inner diameter in step 902.

In still another embodiment, depending on the particular requirements for the center bore 104 and the shaft 400, one or more of the steps in FIG. 9 can be omitted in determining if the center bore 104 is acceptable. The omission of one or more steps from FIG. 9 most likely will result in tighter requirements for the steps that remain in the process.

In yet another embodiment of the present invention, the process of FIG. 9 can be expanded to included additional steps in determining the acceptability of the center bore 104 for subsequent attachment to a shaft 400. For example, the maximum inner diameter measurement can be compared to see if it is greater than a predetermined maximum inner diameter. Other similar types of evaluations and comparisons can be added to the process of FIG. 9 in determining the acceptability of the center bore 104 of the rotor 300 for a subsequent heat shrinking operation.

The rejection of the rotor 300 in step 912 does not necessarily result in the discarding of the rotor 300. Preferably, the rejected rotor 300 can be machined or reworked to attempt to obtain the desired specifications for the rotor 300. After the rejected rotor 300 has been machined the rotor 300 can again be evaluated using the process described in FIGS. 5–9. In another embodiment of the present invention, the machined rotor that was previously rejected can be evaluated using any suitable process for evaluating the center bore 104 of the rotor 300.

The sizing and determining steps 504–506 of FIG. 5 (and in FIGS. 8 and 9) are preferably completed by a microprocessor or computer executing a computer program(s). The gauge that is used to take the measurements (whether operated by hand or by machine) as described in step 502 of FIG. 5 (and in FIG. 6) can be used to store or record the measurements of the inner diameter that are taken by the gauge. When all the measurements have been taken by the gauge, the measurements can be transferred from the gauge to a memory used by the computing device or microprocessor by either a direct connection, which can be wired or wireless, between the gauge and computer memory or by a portable medium that has the data stored thereon, which portable medium is subsequently removed from the gauge and inserted in the computer. Alternatively, after each measurement (or series of measurements) is taken, the inner diameter measurements can be manually recorded and entered into the memory of the computer. After the information has been transferred to the computer or microprocessor, the computer can execute a program that automatically sizes and determines the acceptability of the center bore 104 using the processes described above and presents the results to a user. Alternatively, the sizing and determining processes can be incorporated into either hardware circuits or designs or software programs or routines executable by a microprocessor that are stored or located directly in the gauge, and can inform the user of the acceptability of the center bore 104 without having to process the information with a separate computer or computing device.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of sizing a center bore of a laminated rotor for acceptability in a subsequent operation, the method comprising the steps of:

measuring an inner diameter of a center bore of a laminated rotor a predetermined number of times to obtain a plurality of inner diameter measurements;

evaluating the plurality of inner diameter measurements to determine a reference diameter far the center bore of the laminated rotor; and comparing the reference diameter to a predetermined reference diameter range, wherein the reference diameter being included in the predetermined reference diameter range indicates acceptability of the center bore of the laminated rotor.

2. The method of claim 1 further comprising a step of determining an average diameter for the plurality of inner diameter measurements.

3. The method of claim 2 further comprising the step of comparing the reference diameter to the average diameter, wherein the reference diameter being within a predetermined amount of the average diameter indicates acceptability of the center bore of the laminated rotor.

4. The method of claim 3 further comprising a step of determining a maximum inner diameter and a minimum inner diameter from the plurality of inner diameter measurements.

5. The method of claim 4 wherein the step of determining an average diameter for the plurality of inner diameter measurements includes the step of determining an average of the maximum inner diameter and to minimum inner diameter.

6. The method of claim 4 further comprising the step of comparing the minimum inner diameter to a predetermined minimum inner diameter, wherein the minimum inner diameter being greater than the predetermined minimum inner diameter indicates acceptability of the center bore of the laminated rotor.

7. The method of claim 1 wherein the step of measuring an inner diameter of a center bore includes the step of measuring the inner diameter of the center bare at a predetermined number of depths and a predetermined number of angular positions.

8. The method of claim 7 further comprising the step of comparing the reference diameter to each inner diameter measurement of the plurality of inner diameter measurements at each predetermined depth of the predetermined number of depths, wherein at least one inner diameter measurement of the plurality of inner diameter measurements at each predetermined depth of the predetermined number of depths being less than the reference diameter indicates acceptability of the center bore of the laminated rotor.

9. The method of claim 7 wherein the step of measuring an inner diameter of a center bore further includes the steps of:

positioning a gauge at a predetermined starting depth in the center bore; and measuring an inner diameter of the center bore with the gauge at the predetermined starting depth.

10. The method of claim 9 wherein the step of measuring an inner diameter of a center bore further includes the steps of:

determining the number of depths having inner diameter measurements of the center bore;

positioning the gauge at another depth in the center bore in response to the determined number of depths being less than the predetermined number of depths;

measuring an inner diameter of the center bore with the gauge at the another depth in the center bore; and repeating the steps of determining the number of depths, positioning the gauge at another depth, and measuring an inner diameter of the center bore with the gauge at the another depth until the determined number of depths equals the predetermined number of depths.

11. The method of claim 10 wherein the step of measuring an inner diameter of a center bore further includes the steps of:

determining the number of angular positions having inner diameter measurements of the center bore;

positioning the gauge at another angular position in the center bore in response to the determined number of angular positions being less than the predetermined number of angular positions;

measuring an inner diameter of the center bore with the gauge at the another angular position in the center bore; and repeating the steps of determining the number of angular positions, positioning the gauge at another angular position, and measuring an inner diameter of the center bore with the gauge at the another angular position until the determined number of angular positions equals the predetermined number of angular positions.

12. The method of claim 11 wherein the steps of determining the number of angular positions, positioning the gauge at another angular position, measuring an inner diameter of the center bore with the gauge at the another angular position, and repeating the steps of determining the number of angular positions, positioning the gauge at another angular position, and measuring an inner diameter of the center bore with the gauge at the another angular position occur before the steps of determining the number of depths, positioning the gauge at another depth, measuring an inner diameter of the center bore with the gauge at the another depth, and repeating the steps of determining the number of depths, positioning the gauge at another depth, and measuring an inner diameter of the center bore with the gauge at the another depth.

13. The method of claim 11 wherein the steps of determining the number of depths, positioning the gauge at another depth, measuring an inner diameter of the center bore with the gauge at the another depth, and repeating the steps of determining the number of depths, positioning the gauge at another depth, and measuring an inner diameter of the center bore with the gauge at the another depth occur before the steps of determining the number of angular positions, positioning the gauge at another angular position, measuring an inner diameter of the center bore with the gauge at the another angular position, and repeating the step of determining the number of angular positions, positioning the gauge at another angular position, and measuring an inner diameter of the center bore with the gauge at the another angular position.

14. The method of claim 11 wherein the step of positioning the gauge at another angular position in the center bore includes the step of rotating the gauge a predetermined amount in the center bore.

15. The method of claim 10 wherein the step of positioning the gauge at another depth in the center bore includes the step of inserting the gauge a predetermined distance into the center bore.

16. The method of claim 10 wherein the step of positioning the gauge at another depth in the center bore includes the step of withdrawing the gauge a predetermined distance from the center bore.

17. The method of claim 7 wherein the predetermined number of depths is between 3 and 20.

18. The method of claim 17 wherein the predetermined number of depths is 10.

19. The method of claim 7 wherein the predetermined number of angular positions is between 2 and 12.

20. The method of claim 19 wherein the predetermined number of angular positions is 6.

21. The method of claim 1 wherein the reference diameter is greater than or equal to a predetermined percentage of the plurality of inner diameter measurements.

22. The method of claim 21 wherein the predetermined percentage is between about 35%–75% of the plurality of inner diameter measurements.

23. The method of claim 22 wherein the predetermined percentage is about 50% of the plurality of inner diameter measurements.

24. A computer program product embodied on a computer readable medium and executable by a microprocessor for sizing a center bore of a laminated rotor for acceptability in a subsequent operation, the computer program product comprising computer instructions for executing the steps of:
   receiving a plurality of inner diameter measurements for a center bore of a laminated rotor wherein the plurality of inner diameter measurements is obtained from measuring the inner diameter a predetermined number of times;
   evaluating the plurality of inner diameter measurements to determine a reference diameter for the center bore of the laminated rotor; and
   comparing the reference diameter to a predetermined reference diameter range, wherein the reference diameter being included in the predetermined reference diameter range indicates acceptability of the center bore of the laminated rotor.

25. The computer program product of claim 24 further comprising computer instructions for executing a step of determining an average diameter for the plurality of inner diameter measurements.

26. The computer program product of claim 25 further comprising computer instructions for executing the step of comparing the reference diameter to the average diameter, wherein the reference diameter being within a predetermined amount of the average diameter indicates acceptability of the center bore of the laminated rotor.

27. The computer program product of claim 26 further comprising computer instructions for executing a step of determining a maximum inner diameter and a minimum inner diameter from the plurality of inner diameter measurements.

28. The computer program product of claim 27 wherein the step of determining an average diameter for the plurality of inner diameter measurements includes the step of determining an average of the maximum inner diameter and the minimum inner diameter.

29. The computer program product of claim 27 further comprising computer instructions for executing a step of comparing the minimum inner diameter to a predetermined minimum inner diameter, wherein the minimum inner diameter being greater than the predetermined minimum inner diameter indicates acceptability of the center bore of the laminated rotor.

30. The computer program product of claim 26 wherein the step of determining an average diameter for the plurally of inner diameter measurements includes the step of determining an average of the plurality of inner diameter measurements.

31. The computer program product of claim 24 further comprising computer instructions for executing a step of storing the plurality of inner diameter measurements in a table.

32. The computer program product of claim 31 wherein the table stores the plurality of inner diameter measurements based on a corresponding predetermined depth and a predetermined angular position for each inner diameter measurement of the plurality of inner diameter measurements.

33. The computer program product of claim 32 further comprising computer instructions far executing the step of comparing the reference diameter to each inner diameter measurement of the plurality of inner diameter measurements at a corresponding predetermined depth, wherein at least one inner diameter measurement of the plurality of inner diameter measurements at a corresponding predetermined depth being less than the reference diameter indicates acceptability of the center bore of the laminated rotor.

34. The computer program product of claim 24 wherein the reference diameter is greater than or equal to a predetermined percentage of the plurality of inner diameter measurements.

35. The computer program product of claim 34 wherein the predetermined percentage is between about 35%–75% of the plurality of inner diameter measurements.

36. The computer program product of claim 35 wherein the predetermined percentage is about 50% of the plurality of inner diameter measurements.

37. A system for sizing a center bore of a laminated rotor for acceptability in a subsequent operation, the system comprising:
   a gauge for measuring a predetermined number of inner diameter measurements of a center bore of a laminated rotor; and
   means for processing the predetermined number of inner diameter measurements measured by the gauge to determine acceptability of the center bore of the laminated rotor, the means for processing further comprising:
      means for storing the predetermined number of inner diameter measurements;

means for determining a reference diameter for the center bore of the laminated rotor; and means for comparing the reference diameter to a predetermined reference diameter range, wherein the reference diameter being included in the predetermined reference diameter range indicates acceptability of the center bore of the laminated rotor.

38. The system of claim 37 wherein the reference diameter is greater than or equal to a predetermined percentage of the predetermined number of inner diameter measurements.

39. The system of claim 38 wherein the predetermined percentage is between about 35%–75% of the predetermined number of inner diameter measurements.

40. The system of claim 39 wherein the predetermined percentage is about 50% of the predetermined number of inner diameter measurements.

41. The system of claim 37 wherein the gauge and the means for processing are combined in a single device.

42. The system of claim 37 wherein the predetermined number of inner diameter measurements comprises measurements at a plurality of depths and a plurality of angular positions.

43. The system of claim 42 wherein the means for processing further comprises means for comparing the reference diameter to each inner diameter measurement of the predetermined number of inner diameter measurements at each predetermined depth of the plurality of depths, wherein at least one finer diameter measurement of the predetermined number of inner diameter measurements at each predetermined depth of the plurality of depths being less than the reference diameter indicates acceptability of the center bore of the laminated rotor.

44. The system of claim 37 wherein the means for processing further comprises means for determining an average diameter for the predetermined number of inner diameter measurements.

45. The system of claim 44 wherein the means for processing further comprises means for comparing the reference diameter to the average diameter, wherein the reference diameter being within a predetermined amount of the average diameter indicates acceptability of the center bore of the laminated rotor.

46. The system of claim 45 wherein the means for processing further comprises means for determining a maximum inner diameter and a minimum inner diameter from the predetermined number of inner diameter measurements.

47. The system of claim 46 wherein the means for processing further comprises means for determining an average diameter for the predetermined number of inner diameter measurements as an average of the maximum inner diameter and the minimum inner diameter.

48. The system of claim 46 wherein the means for processing further comprises means for comparing the minimum inner diameter to a predetermined minimum inner diameter, wherein the minimum inner diameter being greater than the predetermined minimum inner diameter indicates acceptability of the center bore of the laminated rotor.

49. The system of claim 45 wherein the means for processing further comprises means for determining an average diameter for the predetermined number of inner diameter measurements as an average of the predetermined number of inner diameter measurements.

50. The system of claim 37 wherein the means for processing comprises at least one computer program and a microprocessor to execute the at least one computer program.

* * * * *

UNITED STATES PATENT AND TRADEMARK OFFICE
CERTIFICATE OF CORRECTION

PATENT NO. : 6,901,675 B2
DATED : June 7, 2005
INVENTOR(S) : Edwards et al.

It is certified that error appears in the above-identified patent and that said Letters Patent is hereby corrected as shown below:

Column 11,
Line 33, "far" should be -- for --.
Line 65, "bare" should be -- bore --.

Column 13,
Line 11, "step" should be -- steps --.

Column 14,
Line 37, "far" should be -- for --.

Column 15,
Line 28, "finer:" should be -- inner --.

Signed and Sealed this

Thirty-first Day of January, 2006

JON W. DUDAS
*Director of the United States Patent and Trademark Office*